(12) United States Patent
Cunningham et al.

(10) Patent No.: US 6,454,306 B1
(45) Date of Patent: Sep. 24, 2002

(54) GAS GENERATOR FOR SEAT BELT PRETENSIONER

(75) Inventors: Clare R. Cunningham, Mesa, AZ (US); Keith R. Ball, Macomb Township, MI (US); Bryan W. Shirk, Mesa, AZ (US); Sheldon R. Fifield, Jr., Mesa, AZ (US); Vincent J. Mramor, Chandler, AZ (US); Brian R. Pitstick, Mesa, AZ (US); Eric C. Erike, Mesa, AZ (US)

(73) Assignees: TRW Inc., Lyndhurst, OH (US); TRW Vehicle Safety Systems Inc., Lyndhurst, OH (US)

( * ) Notice: Subject to any disclaimer, the term of this patent is extended or adjusted under 35 U.S.C. 154(b) by 12 days.

(21) Appl. No.: 09/629,357

(22) Filed: Aug. 1, 2000

(51) Int. Cl.⁷ .................................................. B60R 22/46
(52) U.S. Cl. .................. 280/806; 102/530; 102/202.14; 102/202.9; 242/374; 60/632; 60/636
(58) Field of Search .................................... 280/806, 741; 102/530, 531, 202, 202.1, 202.5, 202.7, 202.4, 202.9; 242/374; 60/632, 636, 637; 297/480

(56) References Cited

U.S. PATENT DOCUMENTS

| | | | |
|---|---|---|---|
| 4,508,287 A | | 4/1985 | Nilsson |
| 5,140,906 A | * | 8/1992 | Little, II ................ 102/202.14 |
| 5,200,574 A | * | 4/1993 | Cunningham et al. ...... 102/530 |
| 5,241,910 A | | 9/1993 | Cunningham et al. |
| 5,553,890 A | * | 9/1996 | Buhr et al. ................. 280/806 |
| 5,602,359 A | * | 2/1997 | Hambro et al. .......... 102/202.5 |
| 5,634,660 A | * | 6/1997 | Fink et al. ................... 280/741 |
| 5,641,131 A | * | 6/1997 | Schmid et al. .............. 242/374 |
| 5,733,135 A | | 3/1998 | Kennedy et al. |
| 5,806,888 A | * | 9/1998 | Adamini ..................... 280/741 |
| 5,842,344 A | | 12/1998 | Schmid |
| 5,956,954 A | * | 9/1999 | Schmid ....................... 60/636 |
| 5,988,069 A | * | 11/1999 | Bailey ..................... 102/202.5 |
| 6,007,097 A | * | 12/1999 | Rink et al. .................. 280/737 |
| 6,009,809 A | * | 1/2000 | Whang .................... 102/202.7 |
| 6,149,095 A | * | 11/2000 | Specht et al. ............... 242/374 |
| 6,155,512 A | * | 12/2000 | Specht et al. ............... 242/374 |
| 6,227,478 B1 | * | 5/2001 | Hudelmaier et al. ........ 242/374 |
| 6,250,683 B1 | * | 6/2001 | Betz ........................... 280/806 |
| 6,272,992 B1 | * | 8/2001 | Chatley, Jr. ............. 102/202.5 |
| 6,283,505 B1 | * | 9/2001 | Saso et al. .................. 280/741 |

FOREIGN PATENT DOCUMENTS

| | | | |
|---|---|---|---|
| DE | 298 19 095 | * | 5/2000 |
| EP | 0 629 531 A1 | * | 12/1994 |

* cited by examiner

*Primary Examiner*—Paul N. Dickson
*Assistant Examiner*—Ruth Ilan
(74) *Attorney, Agent, or Firm*—Tarolli, Sundheim, Covell, Tummino & Szabo L.L.P.

(57) ABSTRACT

An apparatus (10) for providing fluid under pressure for actuating a vehicle occupant protection device comprises an electrically actuatable initiator (80) having terminal pins (100). A hermetically sealed metal propellant container (130) contains a propellant (82) ignitable by the initiator (80) to produce fluid under pressure. The propellant container (130) is secured to the initiator (80) by crimping. The apparatus (10) also comprises a member (86) electrically insulating between the metal propellant container (130) and the terminal pins (100) of the initiator (80) to isolate the initiator electrically from the propellant container.

22 Claims, 4 Drawing Sheets

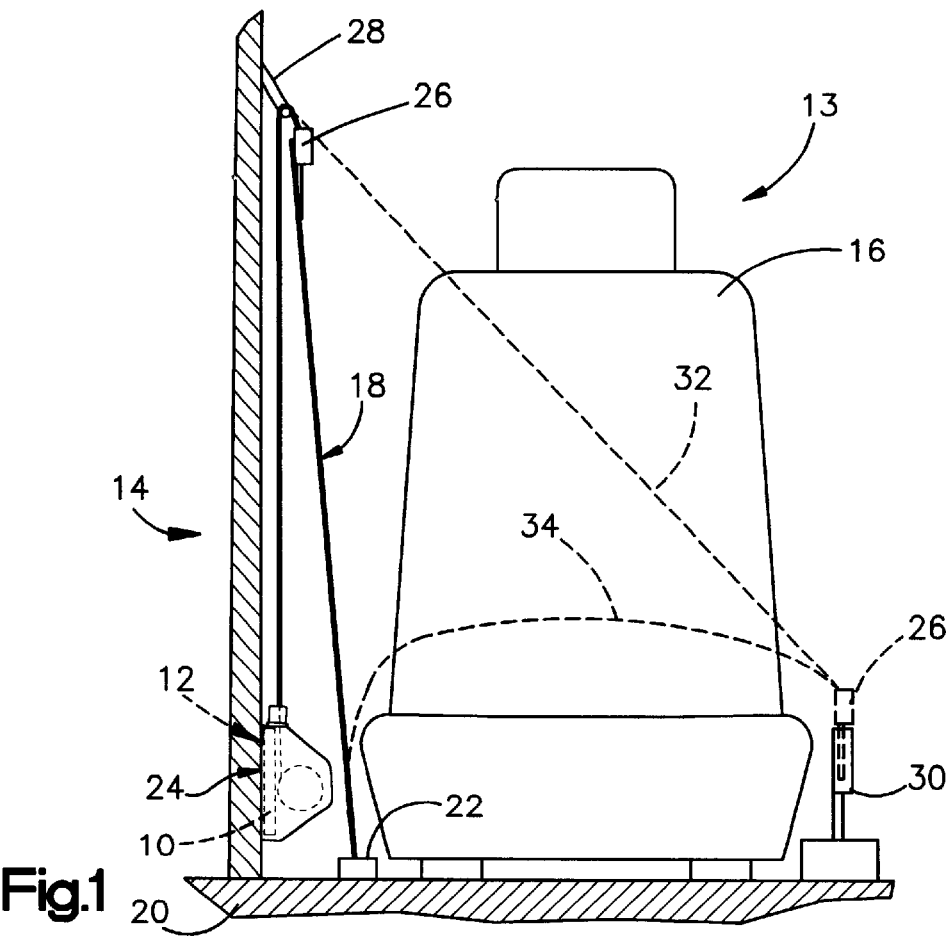
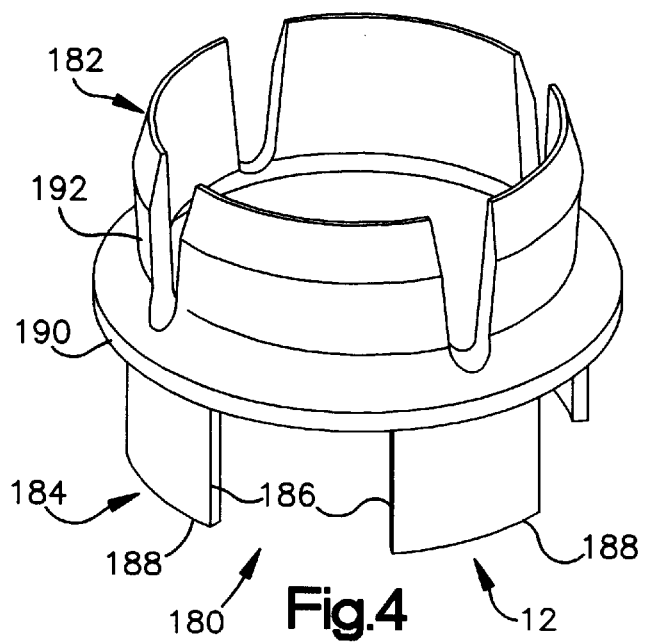

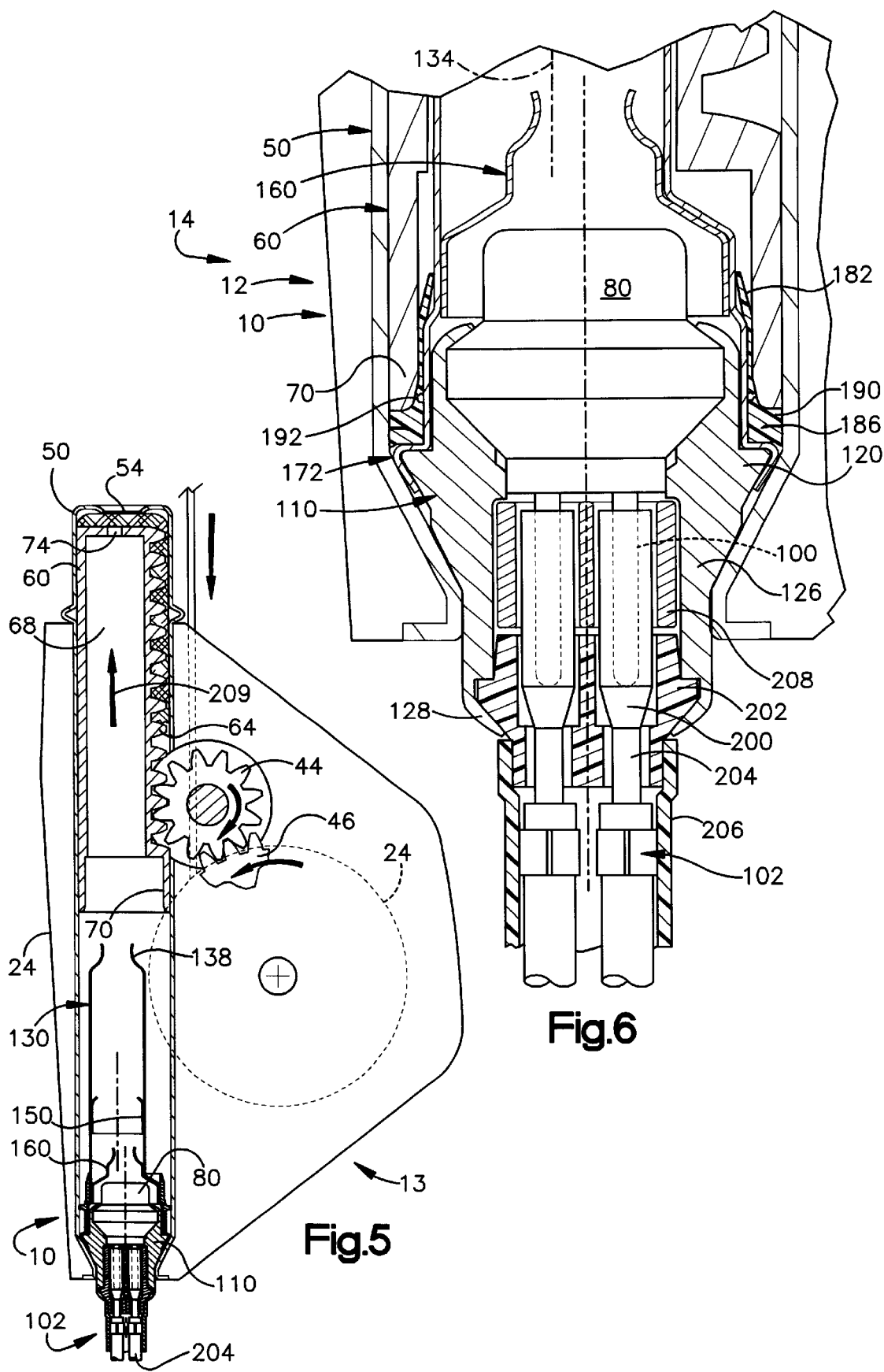

GAS GENERATOR FOR SEAT BELT PRETENSIONER

BACKGROUND OF THE INVENTION

1. Technical Field

The present invention relates to an apparatus for helping to protect a vehicle occupant and, in particular, to a gas generator usable in a seat belt webbing pretensioner.

2. Description of the Prior Art

A known vehicle seat belt system includes a retractor on which seat belt webbing is wound. The retractor has a spool, which is rotatable in a belt withdrawal direction and in an opposite belt retraction direction. The seat belt system also includes a pretensioner. The pretensioner includes a gas generator, which is electrically actuatable to produce fluid under pressure to move a piston in a cylinder. Rack teeth formed on the piston are in meshing engagement with a pinion. Upon actuation of the gas generator, fluid under pressure causes linear movement of the piston, and the rack teeth move linearly to rotate the pinion in a first direction. Rotation of the pinion in the first direction results in rotation of the seat belt webbing spool in a first direction, to remove slack from the seat belt webbing.

The gas generator includes a body of solid propellant and an electrically actuatable initiator for igniting the propellant to generate gas under pressure. The gas generator also includes a member that holds the piston in an initial position at a first end of the cylinder. Upon actuation of the gas generator, the pressurized gas causes the piston to move to the opposite end of the cylinder. Thereafter, an occupant being restrained by the pretensioned seat belt webbing may move forward, causing the seat belt webbing to be withdrawn from the spool and rotating the spool and pinion in a second direction opposite the first direction. The rotation of the pinion in the second direction moves the piston past the initial position to disengage the rack from the pinion and thus release the retractor spool for normal, or untensioned, rotation.

One known gas generator for a seat belt pretensioner includes a molded plastic shell to enclose the propellant. The plastic shell also functions to retain the piston in its initial piston, and breaks to enable movement of the piston past its initial position to disengage the rack from the pinion. Because the shell is plastic, it electrically isolates the propellant, but it does not hermetically seal the propellant. In addition, the plastic shell breaks into fragments upon ignition of the propellant, and the fragments must be filtered.

Another known gas generator for a seat belt pretensioner has a metal shell, which encloses and, thereby, hermetically seals the propellant. The metal shell ruptures upon ignition of the propellant and thus does not produce fragments that must be filtered. The metal shell, however, is welded to a metal header of the initiator or squib. The header is electrically connected with a bridgewire in the squib. Therefore, the metal shell does not electrically isolate the bridgewire and propellant.

SUMMARY OF THE INVENTION

The present invention is an apparatus for providing fluid under pressure for actuating a vehicle occupant protection device. The apparatus comprises an electrically actuatable initiator having terminal pins, and a hermetically sealed metal propellant container containing a propellant ignitable by the initiator to produce fluid under pressure. The propellant container is secured to the initiator by crimping. The apparatus also comprises a member electrically insulating between the metal propellant container and the terminal pins of the initiator to isolate the initiator electrically from the propellant container.

BRIEF DESCRIPTION OF THE DRAWINGS

Further features of the present invention will become apparent to those skilled in the art to which the present invention relates from reading the following specification with reference to the accompanying drawings, in which:

FIG. 1 is a schematic illustration of a vehicle seat belt system having a pretensioning assembly including a gas generator constructed in accordance with the present invention;

FIG. 4 is a perspective view of a rack spacer included in the pretensioning assembly of FIG. 1;

FIG. 5 is a view similar to FIG. 2 showing the pretensioning assembly in an actuated condition; and FIG. 6 is an enlarged view showing a portion of the pretensioning assembly in a condition after the pretensioning operation is completed.

DETAILED DESCRIPTION OF AN EMBODIMENT OF THE INVENTION

Figure 2:
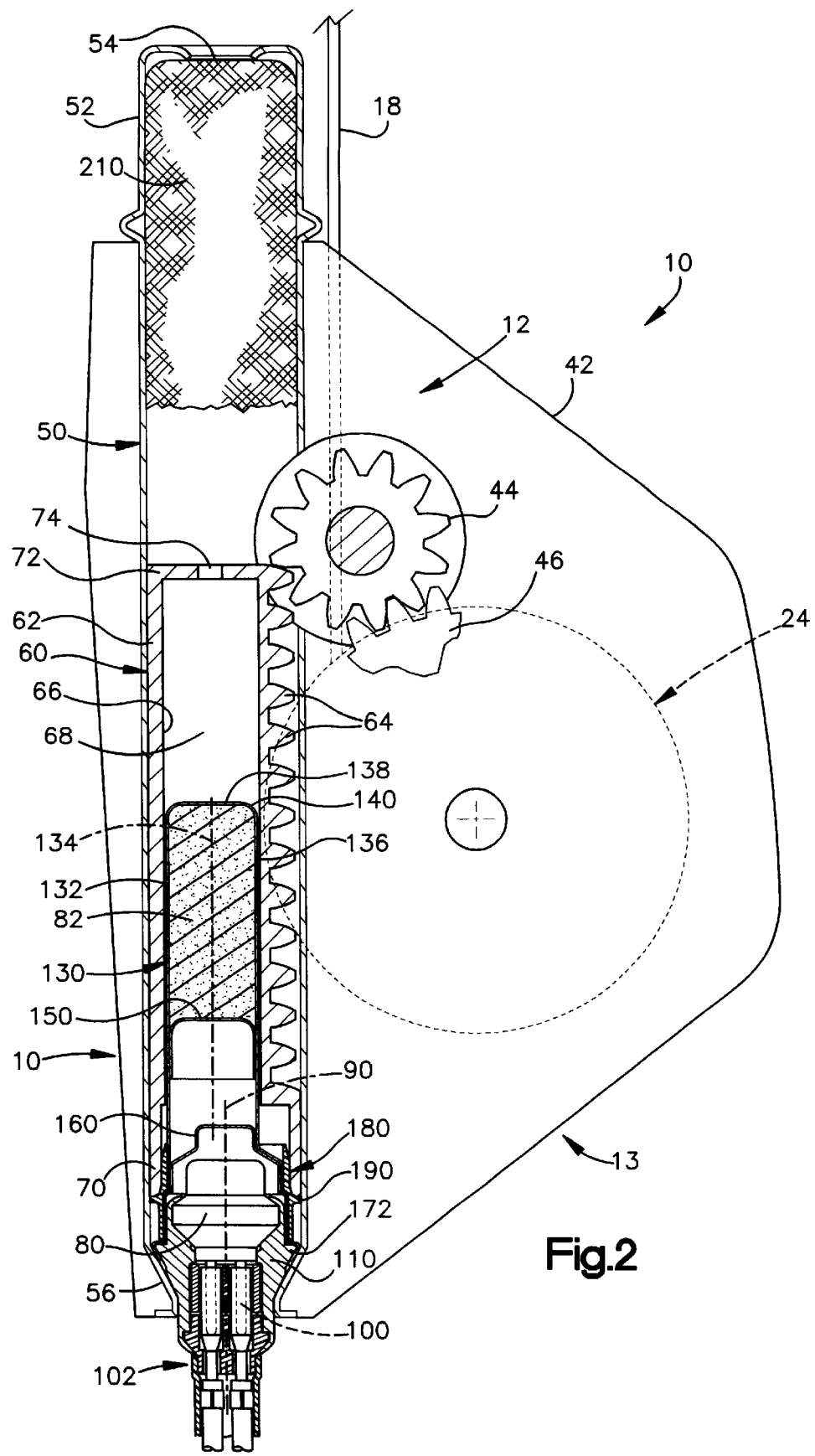
FIG. 2 is an enlarged view, partially in section, of the pretensioning assembly of FIG. 1 and showing the gas generator.

The present invention relates to an apparatus for helping to protect a vehicle occupant and, in particular, to a gas generator usable in a seat belt webbing pretensioner. As representative of the present invention, FIG. 1 illustrates a gas generator 10. The gas generator 10 is incorporated in a pretensioner 12 of a three-point continuous loop seat belt system 13 for use in restraining an occupant of a vehicle 14.

During operation of the vehicle 14, an occupant of the vehicle sits on a seat 16, which is illustrated as a front passenger seat of the vehicle. A length of belt webbing 18 is extensible about the vehicle occupant. One end of the length of belt webbing 18 is anchored to the vehicle body 20 at an anchor point 22. The opposite end of the belt webbing 18 is attached to a retractor 24 secured to the vehicle body 20. The pretensioner 12 is connected with the retractor 24. Intermediate its ends, the belt webbing 18 passes through a tongue assembly 26 and a D-ring or turning loop 28. When the seat belt system 13 is not in use, the belt webbing 18 is wound on the retractor 24 and is oriented generally vertically on one side of the seat 16, as shown in solid lines in FIG. 1.

To engage the seat belt system 13, the tongue assembly 26 is manually grasped and is pulled across the lap and torso of the occupant sitting in the seat 16. As the tongue assembly 26 is pulled across the lap and torso of the occupant, the tongue assembly moves along the belt webbing 18, and the belt webbing is unwound from the retractor 24. When the belt webbing 18 has been pulled across the lap and torso of the occupant, the tongue assembly 26 is connected with a buckle 30, as shown in dashed lines in FIG. 1. The buckle 30 is disposed on the side of the seat 16 opposite the anchor point 22 and the retractor 24. When the seat belt system 13 is thus buckled, the length of belt webbing 18 is divided by the tongue assembly 26 into a torso portion 32, which extends across the torso of the occupant, and a lap portion 34, which extends across the lap of the occupant.

The pretensioner 12 (FIG. 2) includes a pretensioning mechanism. The pretensioning mechanism includes a housing 42. The housing 42 supports a rotatable pinion 44, which is connected in a force-transmitting relationship with the spool 46 of the retractor 24. Specifically, the g ear teeth on the pinion 44 are in meshing engagement with gear teeth formed on one end of the spool 46. The housing 42 may be (or may include) the housing for the retractor 24.

The housing 42 supports a cylinder 50. An upper or outer end portion 52 of the cylinder 50 has a combustion products outlet opening 54. The cylinder 50 has an opposite lower end portion 56 that is smaller in diameter than the upper end portion.

A piston 60 is supported in the cylinder 50 for sliding movement between an unactuated position adjacent the lower end portion 56 of the cylinder 50, as shown in FIG. 2, and an actuated position adjacent the upper end portion 52 of the cylinder, as shown in FIG. 5. The piston 60 is an elongate, tubular member with an outer side wall 62. The side wall 62 has an outer surface on one side of which is formed a set of rack teeth 64. The side wall 62 has a cylindrical inner surface 66 defining a central chamber 68 in the piston 60.

The rack teeth 64 on the piston 60 are in meshing engagement with the pinion 44. As a result, linear movement of the piston 60, as described below, causes rotation of the pinion 44 and, thereby, rotation of the retractor spool 46.

The piston 60 has a closed upper or outer end portion 72 and an opposite lower or inner end portion 70 that is open. The outer end portion 72 of the piston 60 is formed with an outlet opening 74 for permitting flow of combustion products out of the piston.

The pretensioner housing 42 supports the gas generator 10. The gas generator 10 includes an initiator 80. The initiator 80 is preferably a known device of the type used for actuating an air bag inflator, such as the initiator shown in U.S. Pat. No. 5,733,135. The initiator 80, when energized, produces combustion products for initiating actuation of a propellant 82.

Figure 3:
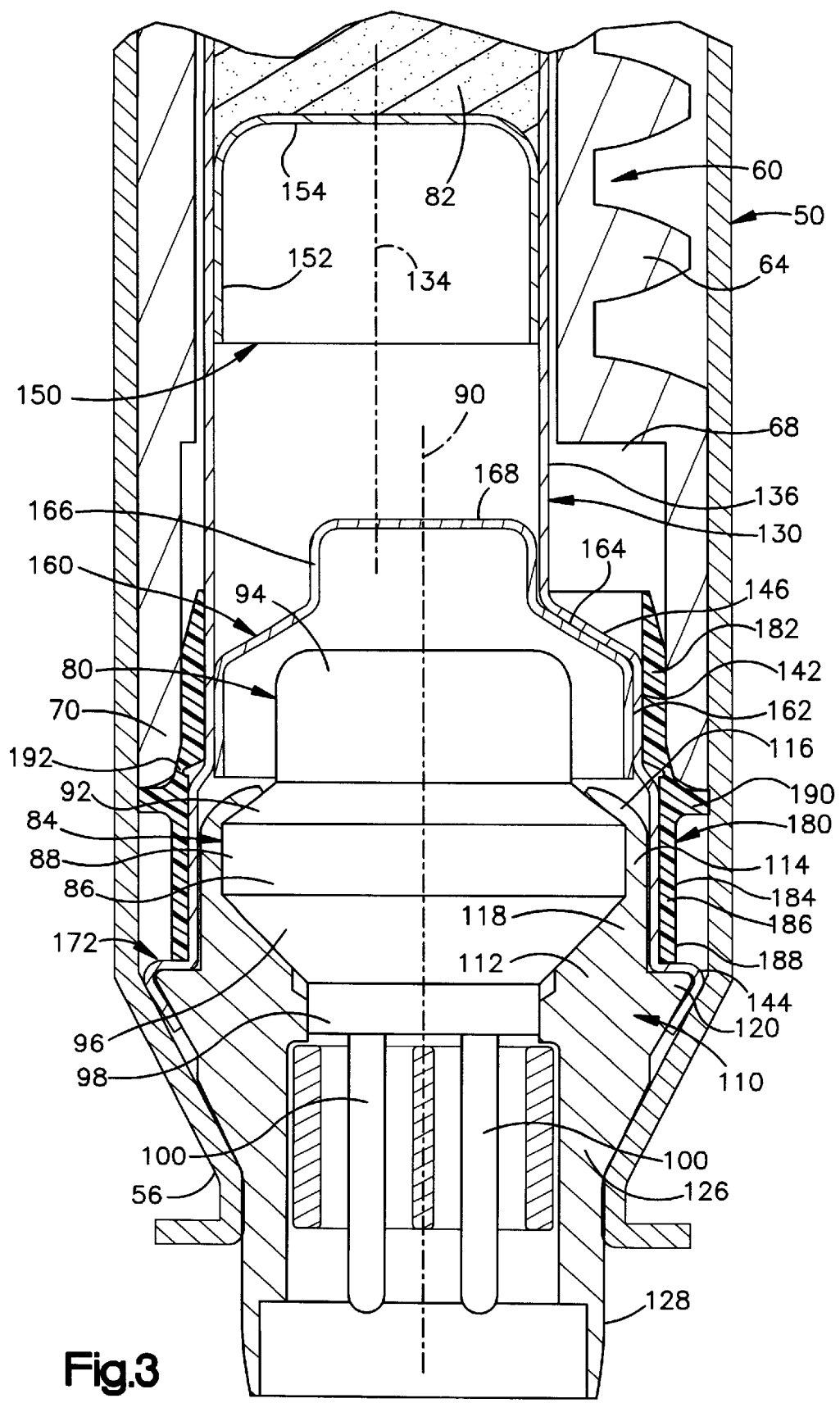
FIG. 3 is a further enlarged view of the a portion gas generator of FIG. 3.

The initiator 80 has a main body portion 84 (FIG. 3) covered by an electrically non-conductive material 86 such as molded plastic. The main body portion 84 of the initiator 80 has a cylindrical central portion 88 centered on a longitudinal central axis 90 of the initiator. A first frustoconical portion 92 of the initiator 80 extends axially between the central portion 88 and a cylindrical upper or outer end portion 94 of the initiator. A second frustoconical portion 96 of the initiator 80 extends between the central portion 88 and a cylindrical lower or inner end portion 98 of the initiator.

The initiator 80 has two electrically conductive terminal pins 100. The terminal pins 100 extend from the inner end portion 98 of the initiator 80. The terminal pins 100 are electrically connected, within the initiator 80, with a resistance wire or bridgewire (not shown) adjacent to an ignitable material (not shown). The terminal pins 100 are engageable by a wire harness 102 (FIG. 2), described below, to enable transmission of an electric current to the bridgewire to cause ignition of the ignitable material in the initiator 80.

The gas generator 10 includes a retainer 110 for mounting the gas generator 10 in the pretensioner housing 42. The retainer 110 is made from a malleable material, which is machined and subsequently formed to the illustrated configuration. The retainer 110 may be made from an electrically conductive material, such as zinc or aluminum.

The retainer 110 has a main body portion 112 disposed radially outward of the second frustoconical portion 96 and the inner end portion 98 of the initiator 80. A part 118 of the main body portion 112 of the retainer 110 extends radially inward of the cylindrical portion 88 of the initiator 80, in abutting engagement with the second frustoconical portion 96 of the initiator. This engagement blocks movement of the initiator 80 relative to the retainer 110 in a direction downward as viewed in FIG. 3.

A cylindrical sleeve portion 114 of the retainer 110 overlies the central portion 88 of the initiator 80. A tubular first crimp portion 116 of the retainer 110 extends from the cylindrical portion 114 and is crimped radially inward into engagement with the first frustoconical portion 92 of the initiator 80. This engagement blocks movement of the initiator 80 relative to the retainer 110 in an upward direction as viewed in FIG. 3.

The retainer 110 has a triangular shoulder 120, which extends radially outward from the main body portion 112. A tubular wire harness socket 126 extends axially from the shoulder 120 in a downward direction as viewed in FIG. 3. The wire harness socket 126 terminates in a tubular second crimp portion 128 of the retainer 110. When the initiator 80 is crimped in the retainer 110 using the first crimp portion 116 as described above, the terminal pins 100 of the initiator are located in the wire harness socket 126.

The propellant 82 (FIG. 2) is a known material ignitable to generate fluid, in the form of gas under pressure, for moving the piston 60. The propellant 82 is contained in a propellant container 130. The propellant container 130 has an elongate, generally cylindrical configuration including a main body portion 132 centered on a propellant axis 134. The propellant axis 134 is offset radially from the initiator axis 90.

The main body portion 132 of the propellant container 130 includes a cylindrical side wall 136 centered on the propellant axis 134. A radially extending end wall 138 closes an upper or outer end portion 140 of the propellant container 130. The end wall 138 is scribed in a cruciform configuration (not shown) to enable the end wall to petal open without creating fragments.

The propellant container 130 includes a cylindrical second portion 142, which is centered on the initiator axis 90. The second portion 142 of the propellant container 130 is larger in diameter than the main body portion 132 of the propellant container. An inner end portion 144 of the propellant container 130 extends from the second portion 142 of the propellant container. Prior to assembly of the gas generator 10, the entire inner end portion 144 of the propellant container 130 extends radially outward from the second portion 142 as an annular flange.

The propellant container 130 has a flared portion 146 which extends between and interconnects the main body portion 132 and the second portion 142 of the propellant container. The flared portion 146 accommodates the radial offset between the main body portion 132, which is centered on the propellant axis 134, and the second portion 142, which is centered on the initiator axis 90.

The volume of the main body portion 132 of the propellant container 130 is greater than the volume of the propellant 82. Therefore, the propellant 82 does not fill the main body portion 132 of the propellant container 130. To prevent movement of the propellant 82 in the container 130, the gas generator 10 includes a propellant retainer 150. The propellant retainer 150 is located inside the propellant container 130.

The propellant retainer 150 is a cup-shaped member having an axially extending, cylindrical side wall 152 and a radially extending, circular end wall 154. During assembly of the gas generator 10, the propellant retainer 150 is pressed into the propellant container 130 so that the end wall 152 comes close to or touches the propellant 82. The propellant retainer 150 has a press fit in the propellant container 130 and thus holds the propellant 82 in the main body portion 132 of the propellant container, at a location spaced apart from the initiator 80.

The propellant retainer 150 is preferably made from a wire mesh material. The wire mesh material has openings small enough to block passage of the propellant material 82 in a direction toward the initiator 80, but large enough to enable flow through the propellant retainer 150 of combustion products of the initiator to ignite the propellant. The propellant retainer 150 could alternatively be made from a solid material, such as stainless steel, having an opening covered by a rupturable membrane such as adhesive tape.

The gas generator 10 also includes a seal cup 160. The seal cup 160 is a cup-shaped member located inside the propellant container 130. The seal cup 160 has a symmetrical configuration centered on the initiator axis 90. The seal cup 160 has a cylindrical outer side wall 162 with a diameter selected to fit closely inside the second portion 142 of the propellant container 130.

The seal cup 160 has a frustoconical wall 164 that tapers from the outer side wall 162, at the same angle as the flared portion 146 of the propellant container 130, to a cylindrical end portion 166 of the seal cup. The seal cup end portion 166 is capped by a radially extending end wall 168 of the seal cup 60.

The seal cup 160 is made from an impervious material. In assembly of the gas generator 10, the seal cup 160 is welded into the propellant container 130, after the propellant 82 and the propellant retainer 150 are pressed into the propellant container. The welding of the seal cup 160 to the propellant container 130 effects a hermetic seal between them. As a result, the propellant 82 is hermetically sealed inside the propellant container 130.

After the seal cup 160 is welded to the propellant container 130, the subassembly of the propellant container, seal cup, and propellant 82 is moved into engagement with the subassembly of the retainer 110 and the initiator 80. Specifically, the radially extending inner end portion 144 of the propellant container 130 is moved into abutting engagement with the shoulder 120 on the retainer 110. The inner end portion 144 of the propellant container 130 is then deformed radially inward and crimped over the shoulder 120 on the retainer 110. As a result, the propellant container 130, including the propellant 82 hermetically sealed in the propellant container, is secured to the retainer 110 and to the initiator 80. The end portion 144 of the propellant container 130, and the shoulder 120 on the retainer 110, together form a stop shoulder 172 of the gas generator 10.

Even though the propellant container 130 and the retainer 110 are both made from metal, the propellant container is not electrically connected to the initiator because the initiator is covered with the electrically non-conductive material 86. This electrical isolation of the propellant container 130 from the initiator 80 minimizes the possibility of an electrical charge being transmitted from the propellant container to the initiator to actuate the initiator inadvertently. Because the metal propellant container 130 is electrically isolated, it need not be covered with a plastic sleeve, which sleeve would rupture upon actuation of the gas generator 10. Rupturing of such a plastic sleeve could produce fragments, which would have to be filtered from the combustion products flowing through the piston outlet opening 74 and the cylinder outlet opening 54.

The gas generator 10 includes a rack spacer 180 for positioning the piston 60 relative to the gas generator 10 in the pretensioner housing 42. The rack spacer 180 is molded as one piece from a plastic material. The rack spacer 180 has an upper or outer end portion 182. The diameter of the outer end portion 182 of the rack spacer 180 is selected to give the outer end portion an interference fit within the inner end portion 70 of the piston 60. In addition, the material of the rack spacer 180 is selected to have characteristics that help the outer end portion 182 of the rack spacer to grip the inner surface 66 of the side wall 62 of the piston 60, as described below.

The rack spacer 180 has a cylindrical inner end portion 184 formed as a plurality of circumferentially spaced fingers 186 (FIG. 4). The fingers 186 have end portions 188. A radially extending shoulder or flange 190 is located between the inner end portion 182 and the outer end portion 184. The rack spacer 180 also has a circumferentially extending thin-walled portion or predetermined weakened portion. 192 located between the outer end portion 182 and the inner end portion 184. The predetermined weakened portion 192 is rupturable, as described below, to enable separation of the inner end portion 184 of the rack spacer 180 from the outer end portion 182.

The wire harness 102 (FIG. 6) includes a pair of metal terminal sleeves 200 secured in a plastic body 202. Each terminal sleeve 200 is electrically connected with a respective lead wire 204. The lead wires 204 are located in a wire cover 206 secured to the plastic body 202. The wire harness 102 also includes a ferrite bead 208 for RF suppression.

The wire harness 102 is connected with the gas generator 10 before the gas generator is mounted in the pretensioner housing 42. Specifically, the wire harness 102 is plugged into the wire harness socket 126 of the retainer 110. The terminal sleeves 200 of the wire harness 102 fit over the terminal pins 100 of the initiator 80 to connect the lead wires 204 electrically with the initiator. The second crimp portion 128 of the retainer 110 is then crimped radially inward over the body 202 of the wire harness 102. As a result, the wire harness 102 is secured to the gas generator 10 and can not be pulled off the terminal pins 100 of the initiator 80.

The gas generator 10 is then in the assembled condition illustrated in FIG. 2. In this condition, the retainer 110 is crimped on the initiator 80. The retainer 110 is also crimped on the wire harness 102. The propellant container 130, including the propellant 82, is crimped on the retainer 110.

After the wire harness 102 is attached, the rack spacer 180 is slipped axially over the outer end portion 140 of the propellant container 130 and moved along the propellant container until the end portions 188 of the fingers 186 engage the radially extending portion 144 of the propellant container. This engagement blocks further downward movement of the rack spacer 180 relative to the gas generator 10 as viewed in FIG. 2.

When the rack spacer 180 is in this installed position on the gas generator 10, the inner end portion 184 of the spacer, that is, the fingers 186, have an interference fit on the second portion 142 of the propellant container 130. The engagement of the inner end portion 184 of the rack spacer 80 with the propellant container 130 holds the spacer 180 in position relative to the gas generator 10. In addition, the plastic material of the rack spacer 180 is selected to help the inner end portion 184 to grip the outside of the propellant container 130.

The gas generator 10, with the rack spacer 180 installed, is placed in the cylinder 50 in the pretensioner housing 42.

The narrowed lower end portion 56 of the cylinder 50 blocks movement of the gas generator 10 in a downward direction as viewed in FIG. 2.

The piston 60 is thereafter installed in the cylinder 50 and slips over the outer end portion 140 of the propellant container 130. The inner end portion 70 of the piston 60 engages the radially extending flange 190 on the rack spacer 180. This engagement limits movement of the piston 60 in a downward direction as viewed in FIG. 2.

The diameter of the outer end portion 182 of the rack spacer 180 is selected to enable the outer end portion 182 to fit within the inner end portion 70 of the piston 60 with an interference fit. As a result, the engagement of the outer end portion 182 of the rack spacer 180 with the inner end portion 70 of the piston 60 holds the piston in position relative to the rack spacer. In addition, the plastic material of the rack spacer 180 helps the outer end portion 182 to grip the inner surface 66 of the piston 60. The electrical isolation of the propellant container 130 allows the material properties of the rack spacer to be optimized for the function of retaining the piston 60 on the gas generator 10.

The piston 60 is thus in an initial position or starting position as viewed in FIG. 2. The rack teeth 64 on the piston 60 are in meshing engagement with the pinion 44. The inner end portion 70 of the piston 60 is spaced apart from the stop shoulder 172 of the gas generator 10.

In the event of a vehicle collision for which protection of the occupant of the vehicle seat 16 is desired, the initiator 80 is electrically actuated with an electric current over the lead wires 204. The initiator 80 generates combustion products under pressure, which flow into propellant container 130. The combustion products of the initiator 80 rupture the seal cup 160 and flow through the openings in the propellant retainer 150 and engage the propellant 82.

The propellant 82 is ignited and generates fluid under pressure, which ruptures the end wall 138 of the propellant container 130. The end wall 138 of the propellant container 130 petals open. The fluid generated by ignition of the propellant 82 flows out of the propellant container 130 into the central chamber 68 of the piston 60. The force of the fluid causes the piston 60 to move in the cylinder 50, off the rack spacer 180, in a direction 209 (FIG. 5) away from the gas generator 10.

The movement of the piston 60 in the cylinder 50 causes the rack teeth 64 on the piston to rotate the pinion 44 in a first direction. Rotation of the pinion 44 results in rotation of the spool of the retractor 24 in the belt retraction direction, to remove slack from the seat belt webbing 18. The movement of the piston 60 in the direction away from the gas generator 10 is stopped by a flame arrestor 210 in the cylinder 50 and the radially extending end wall of the upper end 52 of the cylinder.

During and after movement of the piston 60, the combustion products of the gas generator 10 flow out of the piston 60 through the outlet opening 74, into the cylinder 50. The combustion products are cooled by the flame arrestor 210. The combustion products can flow out of the outlet opening 54 in the cylinder 50 into the ambient atmosphere of the vehicle occupant compartment. Because the end wall 138 of the propellant container 130 is scribed to petal open without creating fragments, the fluid outlet 74 in the piston 60, and the outlet opening 54 in the cylinder 50, can be made free of filters.

After the pretensioning movement is completed, the occupant of the vehicle seat 16 may move forward in the seat, causing the seat belt webbing 18 to be withdrawn from the retractor 24 and rotating the retractor spool in the belt withdrawal direction. The spool rotation causes the pinion 44 to rotate in a second direction opposite the first direction. The rotation of the pinion 44 moves the piston 60, in the cylinder 50, back towards its initial starting position, that is, downward as viewed in FIGS. 5 and 6.

This movement of the piston 60 causes the inner end portion 70 of the piston to engage the flange 190 on the rack spacer. The force of the movement of the piston 60 is transmitted through the flange 190 and ruptures the rack spacer 180 at the predetermined weakened portion 192. The inner end portion 182 of the rack spacer 180 separates from the outer end portion 184 of the rack spacer.

The separation of the rack spacer 180 allows the piston 60 to overtravel, that is, continue moving past its initial position. The piston 60 forces the flange 190 of the spacer 180 toward the stop shoulder 172 of the gas generator 10. As the piston 60 moves toward the stop shoulder 172, the fingers 186 of the inner end portion 184 of the rack spacer 180 are crushed. This overtravel movement of the piston 60 is terminated by the engagement of the spacer flange 190 and the crushed fingers 186 with the stop shoulder 172 of the gas generator 10. During this overtravel movement, the piston 60 moves far enough that the rack teeth 64 disengage from the pinion 44 and thus release the retractor spool for normal (unpretensioned) rotation.

From the above description of the invention, those skilled in the art will perceive improvements, changes and modifications in the invention. Such improvements, changes and modifications within the skill of the art are intended to be covered by the appended claims.

Having described the invention, we claim:

1. An apparatus for providing fluid under pressure for actuating a vehicle occupant protection device, said apparatus comprising:

a cylinder;

a piston movable in said cylinder to effect pretensioning of vehicle seat belt webbing;

an electrically actuatable initiator having terminal pins;

a hermetically sealed metal propellant container disposed within said cylinder, said propellant container containing a propellant ignitable by said initiator to produce fluid under pressure, said propellant container being secured to said initiator by a crimp of said propellant container; and a member electrically insulating between said metal propellant container and said terminal pins of said initiator thereby to electrically isolate said initiator from said propellant container.

2. An apparatus as set forth in claim 1 wherein said member comprises an electrically insulating covering on said initiator for blocking flow of electric current between the exterior of said initiator and said terminal pins.

3. An apparatus as set forth in claim 2 wherein said metal propellant container is crimped onto a metal member which is crimped onto said electrically insulating covering on said initiator.

4. An apparatus as set forth in claim 1 comprising a retainer crimped onto said initiator to secure said initiator in the vehicle occupant protection device, said propellant container being crimped onto said retainer to secure said propellant container in the vehicle occupant protection device.

5. An apparatus as set forth in claim 4 further comprising a wire harness having lead wires connected with said terminal pins of said initiator for transmitting an electric actuating signal to said initiator, said retainer being crimped onto said wire harness to secure said wire harness to said apparatus.

6. An apparatus for tensioning vehicle seat belt webbing, said apparatus comprising:
- a cylinder;
- a piston movable in said cylinder to effect pretensioning of the vehicle seat belt webbing; and
- a fluid source for providing fluid under pressure to move said piston in said cylinder, said fluid source comprising:
  - an electrically actuatable initiator;
  - a propellant container secured to said initiator and defining a propellant chamber adjacent said initiator;
  - a propellant in said propellant chamber and ignitable by said initiator to produce fluid under pressure, said propellant having a volume less than the volume of said propellant chamber and being disposed in said propellant chamber at a location spaced apart from said initiator; and
  - a propellant retainer inside said propellant chamber between said initiator and said propellant and engageable with said propellant at a location spaced apart from said initiator to block movement of said propellant in said propellant chamber.

7. The apparatus as set forth in claim 6 wherein sa id propellant retainer is press fitted in said propellant container.

8. The apparatus as set forth in claim 6 wherein said propellant retainer has at least one opening for enabling flow of combustion products of said initiator to said propellant to ignite said propellant.

9. The apparatus as set forth in claim 8 further comprising a seal cup in said propellant container, said seal cup being secured to said propellant container to hermetically seal said propellant from said initiator.

10. The apparatus as set forth in claim 9 wherein said seal cup is welded to said propellant container.

11. The apparatus as set forth in claim 6 comprising an electrically non-conductive member insulating between said propellant container and said initiator.

12. The apparatus as set forth in claim 6 comprising a plastic rack spacer on said propellant container for holding said piston in position on said fluid source prior to actuation of said fluid source.

13. The apparatus as set forth in claim 6 wherein said propellant container is crimped onto said initiator.

14. A pretensioner comprising:
- a cylinder;
- a piston movable in said cylinder to effect pretensioning of vehicle seat belt webbing, said piston having an end portion;
- a fluid source for providing fluid under pressure into the interior of said piston to move said piston in said cylinder, said fluid source comprising a propellant, a propellant container containing said propellant, and an electrically actuatable initiator for igniting said propellant; and
- a spacer movable on said propellant container into a retaining position on said propellant container, said spacer having a first portion engaging said piston to retain said piston in a first position relative to said fluid source prior to actuation of said initiator, said spacer having a frangible second portion;
- said piston being movable in a first direction in said cylinder away from said spacer in response to actuation of said fluid source to effect pretensioning of the vehicle seat belt webbing;
- said piston being movable in response to tensioning of the seat belt webbing in a second direction in said cylinder opposite to said first direction, pas t said first position to a second position thereby breaking said frangible second portion of said spacer.

15. The pretensioner as set forth in claim 14 wherein said first portion of said spacer is disposed within a chamber in said piston in engagement with an inner wall surface of said piston.

16. The pretensioner as set forth in claim 14 wherein said second portion of said spacer engages a stop shoulder on said fluid source when said piston is in the first position to set the initial position of said spacer on said propellant container.

17. The pretensioner as set forth in claim 14 wherein said first portion of said spacer has a cylindrical configuration and has an interference fit with an inner wall surface within said piston, said second portion of said spacer being separated from said first portion by a circumferential thin-walled portion of said spacer.

18. The pretensioner as set forth in claim 17 wherein said second portion of said spacer comprises a plurality of fingers which crush upon movement of said piston past the initial position.

19. A pretensioner comprising:
- a cylinder;
- a piston movable in said cylinder to effect pretensioning of vehicle seat belt webbing, said piston having an end portion; and
- a fluid source for providing fluid under pressure to move said piston in said cylinder, said fluid source comprising:
  - an electrically actuatable initiator, said initiator having at least two terminal pins for receiving an electric actuating signal;
  - a wire harness having lead wires connected with said terminal pins of said initiator for transmitting an electric actuating signal to said initiator;
  - a hermetically sealed propellant container containing a propellant ignitable by said initiator to produce, fluid under pressure; and
  - a retainer for mounting said fluid source in said cylinder, said retainer being crimped onto said initiator to secure said initiator in said cylinder, said retainer also being crimped onto said wire harness to secure said wire harness to said initiator, said retainer further being attached to said propellant container.

20. The pretensioner as set forth in claim 19 wherein said propellant container is crimped onto said retainer to secure said propellant container in said cylinder.

21. The pretensioner as set forth in claim 20 wherein said propellant container is made from metal and said retainer is made from metal.

22. The pretensioner as set forth in claim 19 wherein said initiator has a non-conductive outer covering onto which said propellant container is crimped to isolate said propellant container electrically from said initiator.

* * * * *